J. CALDWELL.
APPARATUS FOR REMOVING WALL PAPER.
APPLICATION FILED JULY 29, 1910.
991,826.
Patented May 9, 1911.
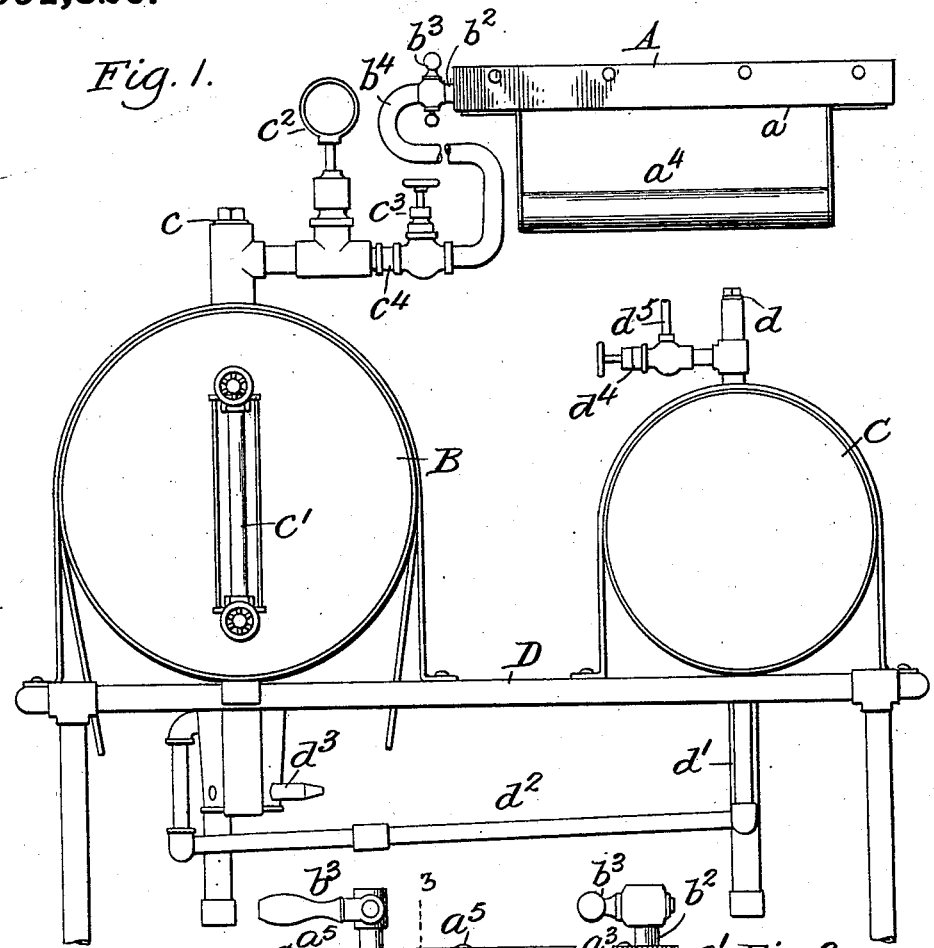
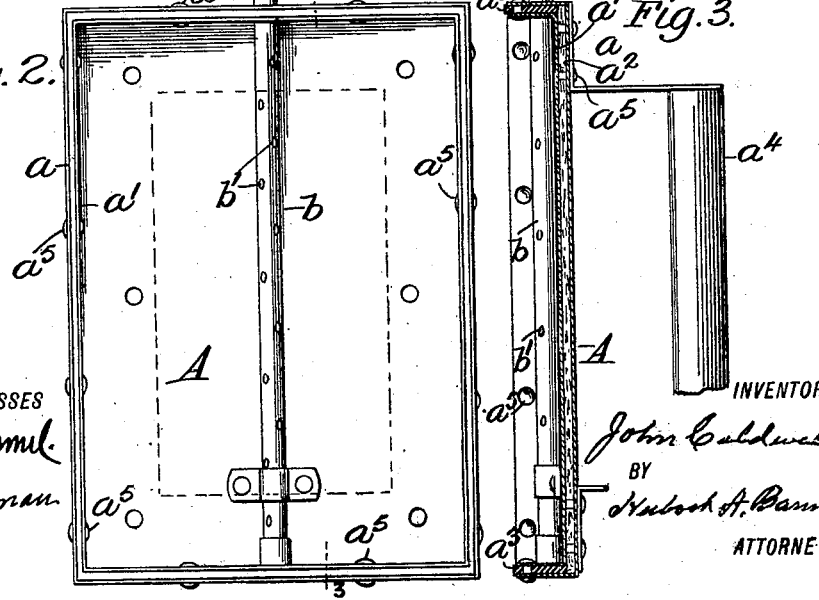
WITNESSES
J. P. Duhamel.
F. W. Wiman.
INVENTOR
John Caldwell,
BY
Halsch A. Banning
ATTORNEY

UNITED STATES PATENT OFFICE.

JOHN CALDWELL, OF NEW YORK, N. Y., ASSIGNOR, BY DIRECT AND MESNE ASSIGNMENTS, OF ONE-THIRD TO FRANK C. DUNTLIN AND ONE-THIRD TO WALTER H. WILLIAMS, BOTH OF NEW YORK, N. Y.

APPARATUS FOR REMOVING WALL-PAPER.

991,826.   Specification of Letters Patent.   Patented May 9, 1911.

Application filed July 29, 1910. Serial No. 574,586.

*To all whom it may concern:*

Be it known that I, JOHN CALDWELL, a citizen of the United States, and resident of the city of New York, in the county and State of New York, have invented certain new and useful Improvements in Apparatus for Removing Wall-Paper, of which the following is a specification, reference being had to the accompanying drawings.

My invention relates to machines or apparatus used in the process of removing paper from the walls of stores, offices, apartments, dwellings, etc. In apparatus of this nature, the agent employed for loosening the paper is steam, and it is applied in such a way as to avoid injury to the plaster or to the adjoining trim.

The object of the invention is to provide means for applying the steam to the wall paper in a quick and convenient manner and to combine the same with a simple and convenient steam generator and gasolene tank so as to make a complete portable apparatus.

The invention consists primarily in the construction of the steam case, and further in the combination thereof with other elements or parts, as hereinafter more fully described and pointed out or indicated in and by the claims.

In the accompanying drawings Figure 1, is a front end view of the apparatus showing the front end of the boiler or steam generator, the front end of the gasolene tank, part of the supporting frame and connections by a flexible tube to the steam case and also the valves. Fig. 2 is plan view of the steam case, looking into it; Fig. 3 a section on the line 3, 3, of Fig. 2.

In these drawings the steam case A, is shown as comprising an outer pan $a$ and an inner pan $a^1$ which may be made of tin, galvanized iron, or of other light metal. The outer pan is enough larger than the inner pan to permit an asbestos lining $a^2$ between the bottoms of the two pans, and to permit a packing $a^3$ between the ends and sides of the two pans. The packing $a^3$ may be of rubber which projects from the ends and sides sufficiently to press against the wall paper and confine the steam within the steam case A. The asbestos lining $a^2$ prevents the back of the steam case from becoming too much heated for comfortable manipulation by the handle $a^4$ to be held by the operator.

The outer and inner pans and the various parts which compose the steam case are securely held in place and together by rivets $a^5$, but may be constructed and secured in any suitable way.

A steam pipe $b$ is passed into the inner pan $a^1$ and is properly secured; the steam pipe $b$ is perforated as shown by the holes $b^1$ which admit the steam to the interior of the case A, and in contact with the wall paper. The perforations in the steam pipe $b$, distribute the steam inside of the inner pan so that it exerts more pressure and expands over a wider area in contact with the paper than if simply admitted to the pan through an opening in one of its sides, and causes a quicker and more certain loosening of the paper. The perforated steam pipe may be arranged as shown or otherwise, to produce the result, and more than one perforated steam pipe may extend within the inner pan if deemed best. The pipe $b$, has a projection $b^2$ extending somewhat outside of the steam case and the extension $b^2$ is provided with a valve or cock $b^3$ for admitting or shutting off the steam as desired by the operator.

The steam may be taken from any convenient source of supply, such as the steam pipes leading to the radiators in offices and apartments, or the apparatus may have its own steam generator as shown by the drawings, the connection for supplying the steam being a flexible tube $b^4$ connected at one end with the extension $b^2$ of the pipe $b$ and at its other end with a primary source of supply.

The apparatus in its completeness, as shown by the drawings, has a steam generator B and a gasolene tank C, with suitable connections, and the generator and gasolene tank are mounted on a frame D, so that as a whole the apparatus may be transported, set up, and used wherever desired, regardless of any extraneous source of steam supply. The generator B, and tank C, are preferably made of malleable iron, while the supports or frame may be of any form or material adapted to the purpose.

The generator B, has an inlet closed by plug $c$ for filling purposes, and is fitted with a water gage and glass $c^1$, and with a safety valve $c^2$, as well as with a steam valve $c^3$, in a pipe $c^4$, to which the flexible tube $b^4$ may be connected. The boiler or generator B may also have a blow off opening through which an operator can clean the boiler out as occasion requires.

The gasolene tank C has inlet or supply opening closed by a plug $d$, and it also has outlet pipes $d^1$, $d^2$, through which the gasolene is forced by air pressure admitted by an inlet $d^3$, and a valve $d^4$, from an air pump not shown, so that the gasolene passes to one or more suitable burners $d^5$ beneath the boiler B. It is not necessary that there be a very high pressure of the steam, and the heating of the generator by gasolene burners is a quick operation. When there is sufficient pressure the steam is admitted to the steam case, by opening the valves $c^3$ and $b^3$, and the loosening of the paper is a matter of a few seconds when the steam is admitted and the steam case pressed against the paper in the manner before stated.

Having thus described my invention what I claim as new, and desire to secure by Letters Patent, is:—

1. Apparatus for removing wall paper, comprising a steam case composed of an outer and inner pan, an asbestos packing between the backs of said pans, a handle on the outer pan, a perforated steam pipe extending within the inner pan, said steam pipe having an outer extension provided with a valve, whereby the admission of steam may be controlled and the wall paper loosened by its application thereto.

2. Apparatus for removing wall paper, comprising a steam case, composed of an outer and inner pan securely held together, a steam pipe extending outside and inside of the two pans, said pipe being perforated inside of the inner pan, a steam valve in the outer extension of said pipe, and a flexible steam tube connected at one end with said pipe and at the other with a source of steam supply.

JOHN CALDWELL.

Witnesses:
 FRANK C. DUNTLIN,
 HOWARD CAMPBELL.

---

Copies of this patent may be obtained for five cents each, by addressing the "Commissioner of Patents, Washington, D. C."